(12) United States Patent
Thiebaud et al.

(10) Patent No.: US 11,593,914 B2
(45) Date of Patent: Feb. 28, 2023

(54) METHOD AND A DISPLAY DEVICE WITH PIXEL REPARTITION OPTIMIZATION

(71) Applicant: INTERDIGITAL CE PATENT HOLDINGS, SAS, Paris (FR)

(72) Inventors: Sylvain Thiebaud, Noyal sur Vilaine (FR); Laurent Blonde, Thorigné-Fouillard (FR); Thierry Tapie, Rennes (FR); Valter Drazic, Betton (FR)

(73) Assignee: INTERDIGITAL CE PATENT HOLDINGS, SAS, Paris (FR)

( * ) Notice: Subject to any disclaimer, the term of this patent is extended or adjusted under 35 U.S.C. 154(b) by 95 days.

(21) Appl. No.: 15/318,997

(22) PCT Filed: Jun. 16, 2015

(86) PCT No.: PCT/EP2015/063435
§ 371 (c)(1),
(2) Date: Dec. 15, 2016

(87) PCT Pub. No.: WO2015/193287
PCT Pub. Date: Dec. 23, 2015

(65) Prior Publication Data
US 2017/0132757 A1 May 11, 2017

(30) Foreign Application Priority Data
Jun. 17, 2014 (EP) ..................................... 14305923

(51) Int. Cl.
*G06T 3/40* (2006.01)
*G02B 27/01* (2006.01)
(Continued)

(52) U.S. Cl.
CPC .......... *G06T 3/4023* (2013.01); *G02B 27/017* (2013.01); *G06F 3/012* (2013.01);
(Continued)

(58) Field of Classification Search
CPC ..... G06T 11/001; G06T 11/60; G06T 15/005; G06T 3/4007; G06T 3/0025;
(Continued)

(56) References Cited

U.S. PATENT DOCUMENTS 5,726,670 A  3/1998 Seiichiro et al.
7,417,617 B2  8/2008 Eichenlaub
(Continued)

FOREIGN PATENT DOCUMENTS

CN  102540463 A  7/2012
CN  103593051 A  2/2014
(Continued)

OTHER PUBLICATIONS

Eichenlaub et al., "Increased Resolution on an ICFLCD Display Through Field-Sequential Subpixel Illumination", SID Symposium Digest of Technical Papers, vol. 29, No. 1, May 1998, pp. 411-414. Abstract.
(Continued)

*Primary Examiner* — Jacinta M Crawford
*Assistant Examiner* — Andrew Shin
(74) *Attorney, Agent, or Firm* — Condo Roccia Koptiw LLP

(57) ABSTRACT

A method for presenting an image on a display device (100) includes modifying the image by applying a geometric transformation to the image so that an area of the image on the display device is presented to a viewer with higher density of pixels than that in the rest of the image (S18).

20 Claims, 8 Drawing Sheets

(51) Int. Cl.
*G06T 3/00* (2006.01)
*G06V 40/19* (2022.01)
*G06F 3/01* (2006.01)
*G02B 27/00* (2006.01)

(52) U.S. Cl.
CPC ............ *G06F 3/013* (2013.01); *G06T 3/0025* (2013.01); *G06V 40/19* (2022.01); *G02B 27/0093* (2013.01); *G02B 2027/014* (2013.01); *G02B 2027/0147* (2013.01); *G02B 2027/0178* (2013.01); *G02B 2027/0187* (2013.01); *G06T 2207/20016* (2013.01); *G06T 2207/20104* (2013.01)

(58) Field of Classification Search
CPC ......... G06T 3/4023; G06T 2207/20104; G06T 2207/20016; G02B 27/017; G02B 2027/0178; G02B 27/0093; G02B 2027/014; G02B 2027/0147; G02B 2027/0187; G06F 3/0481; G06F 3/013; G06F 3/012; H04N 7/30; G06K 9/00604
USPC .... 345/581, 619, 643, 647, 8; 382/248, 276, 382/299
See application file for complete search history.

(56) References Cited

U.S. PATENT DOCUMENTS

| | | | |
|---|---|---|---|
| 7,495,638 | B2 | 2/2009 | Lamvik |
| 2002/0063807 | A1 | 5/2002 | Margulis |
| 2002/0113782 | A1 | 8/2002 | Verberne et al. |
| 2002/0141614 | A1 | 10/2002 | Lin |
| 2004/0227703 | A1 | 11/2004 | Lamvik et al. |
| 2006/0145945 | A1 | 7/2006 | Lewis et al. |
| 2009/0102915 | A1 | 4/2009 | Arsenich |
| 2009/0309811 | A1 | 12/2009 | Hinton |
| 2012/0068913 | A1 | 3/2012 | Bar-zeev et al. |
| 2012/0105310 | A1 | 5/2012 | Sverdrup et al. |
| 2012/0154277 | A1 | 6/2012 | Bar-Zeev et al. |
| 2012/0320463 | A1* | 12/2012 | Shabtay .................. G02B 7/102 359/648 |
| 2013/0016413 | A1* | 1/2013 | Saeedi ............... G02B 27/0172 359/205.1 |
| 2013/0215147 | A1 | 8/2013 | Hilkes et al. |
| 2013/0235169 | A1 | 9/2013 | Kato et al. |
| 2013/0246967 | A1* | 9/2013 | Wheeler .................. G06F 3/012 715/784 |
| 2014/0085190 | A1 | 3/2014 | Erinjippurath et al. |

FOREIGN PATENT DOCUMENTS

| | | |
|---|---|---|
| EP | 2073191 | 6/2009 |
| JP | H01252993 A | 10/1989 |
| JP | H0638219 A | 2/1994 |
| JP | H0713497 A | 1/1995 |
| JP | H07104210 A | 4/1995 |
| JP | H07134542 A | 5/1995 |
| JP | H08237636 A | 9/1996 |
| JP | 2000310747 A | 11/2000 |
| JP | 2001281594 A | 10/2001 |
| JP | 2009510540 A | 3/2009 |
| JP | 2014071811 A | 4/2014 |
| KR | 20020089475 A | 11/2002 |
| KR | 20030007708 A | 1/2003 |
| KR | 20090067123 A | 6/2009 |
| RU | 2322771 | 4/2008 |
| WO | WO 2006118483 | 11/2006 |
| WO | WO2012082807 | 6/2012 |
| WO | WO2013009414 | 1/2013 |
| WO | WO2013090100 | 6/2013 |
| WO | WO 2014054210 A2 | 4/2014 |

OTHER PUBLICATIONS

Harding et al., "Evaluation of the Microvision Helmet-Mounted Display Technology for Synthetic Vision Application Engineering Prototype for the Virtual Cockpit Optimization Program", US Army Aeromedical Research Laboratory, Report 2004-02, Nov. 2003, pp. 1-29.
Rilecke et al., "Selected Technical and Perceptual Aspects of Virtual Reality Displays", Max Planck Institute for Biological Cybernetics, Technical Report 154, Oct. 2006, pp. 1-16.
Hua et al., "A compact eyetracked optical see-through head-mounted display", Proceedings of SPIE, Stereoscopic Displays and Applications XXIII, vol. 8288, Feb. 9, 2012, pp. 1-9.
Kreylos, "An eye-tracked oculus rift", Doc-ok.org, http://doc-ok.org/?p=1021, Jun. 2, 2014, pp. 1-21.
Vockeroth et al., "The Combination of a Mobile Gaze-Driven and a Head-Mounted Camera in a Hybrid Perspective Setup", IEEE International Conference on Systems, Man and Cybernetics, Montreal, Canada, Oct. 7, 2007, pp. 2576-2581.
Anonymous, "How barrel distortion works on the Oculus Rift", https://www.youtube.com/watch?v=B7qrgrrHry0, Jan. 19, 2014, pp. 1.
PatBase English Language Translation, CN 103593051 A.
PatDocs English Language Translation, JP H08237636 A.
PatDocs English Language Translation, JP H0713497 A.
PatDocs English Language Translation, JP H07134542 A.
PatDocs English Language Translation, JP H07104210 A.
PatDocs English Language Translation, JP H0638219 A.
PatDocs English Language Translation, JP 2001281594 A.
PatDocs English Language Translation, JP 2000310747 A.

* cited by examiner (a)

(b)

METHOD AND A DISPLAY DEVICE WITH PIXEL REPARTITION OPTIMIZATION

CROSS REFERENCE TO RELATED APPLICATIONS

This application is the national stage entry under 35 U.S.C. § 371 of International Application PCT/EP2015/063435 filed Jun. 16, 2015, which was published in accordance with PCT Article 21(2) on Dec. 23, 2015, in English, and which claims the benefit of European Application No. 14305923.6 filed Jun. 17, 2014. The European and PCT applications are expressly incorporated by reference herein in their entirety for all purposes.

TECHNICAL FIELD

The present disclosure generally relates to a display device with pixel repartition optimization. The display device may be a user wearable display device such as a head mounted display (HMD) device, but not be limited to such kind of display device.

BACKGROUND ART

These HMD devices are mainly composed of a display module (LCD or OLED, for example), and an optics. This optics is usually designed to modify the light as if it was generated at infinity or at finite but large distance (e.g. human eye hyper-focal distance) from the viewer (to allow the accommodation to a screen placed so close), and to increase the field of view to improve the sentiment of immersion.

These HMD devices may be coupled with a sensor such as inertial measurement unit (IMU) to measure the position of a user's head. Thanks to the sensor, the video content provided to the user through the display can depend on his/her head orientation, thus the user can move in a virtual world and feel a sentiment of immersion.

US 2012/0154277 A1 discloses to track user's head and eye position in order to determine a focal region for the user and to couple a portion of the optimized image to the user's focal region. However, any concepts for optimizing pixel repartition of an image to be presented on the display are not considered in US 2012/0154277 A1.

SUMMARY

According to one aspect of the present disclosure, a method for presenting an image on a display device is provided. The method includes modifying the image by applying a geometric transformation to the image so that an area of the image on the display device is presented to a viewer with higher density of pixels than that in the rest of the image.

According to another aspect of the present disclosure, a display device for presenting an image comprising a processor is provided. The processor is configured to modify the image by applying a geometric transformation to the image so that an area of the image on the display device is presented to a viewer with higher density of pixels than that in the rest of the image.

The object and advantages of the present disclosure will be realized and attained by means of the elements and combinations particularly pointed out in the claims.

It is to be understood that both the foregoing general description and the following detailed description are exemplary and explanatory and are not restrictive of the disclosure, as claimed.

BRIEF DESCRIPTION OF THE DRAWINGS

These and other aspects, features and advantages of the present disclosure will become apparent from the following description in connection with the accompanying drawings in which.

DESCRIPTION OF EMBODIMENTS

In the following description, various aspects of an exemplary embodiment of the present disclosure will be described. For the purpose of explanation, specific configurations and details are set forth in order to provide a thorough understanding. However, it will also be apparent to one skilled in the art that the present disclosure may be implemented without the specific details present herein.

In order to facilitate the understanding of the concept of an embodiment of the disclosure, some characteristics of the Human Visual System are first introduced.

Figure 1:
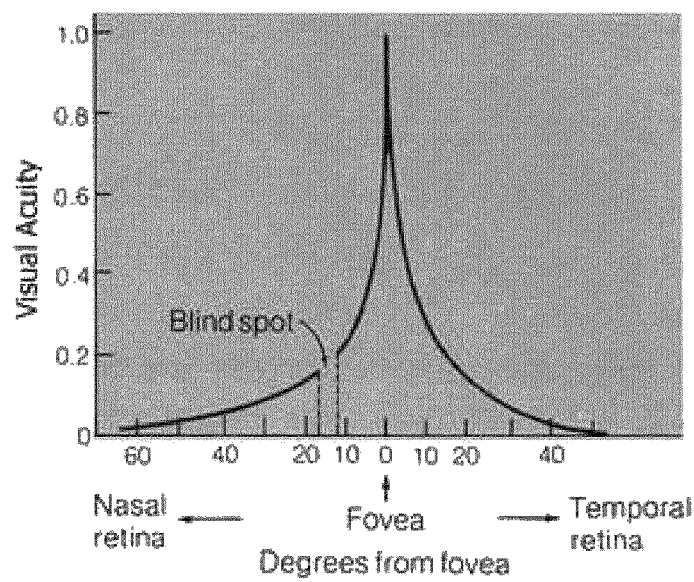
FIG. 1 represents the visual acuity depending on the angular position around the fovea.

FIG. 1 represents the visual acuity depending on the angular position around the fovea, which is cited from the page related to the "fovea centralis" of the Wikipedia. The fovea is the central area of the eye where the density of cones is the highest. This area represents only a couple of degrees, where the visual acuity is maximal. This acuity decreases rapidly when the field of view increases (see FIG. 1). It means that, even if a large field of view is required to bring a feeling of immersion to the viewer, the details cannot be perceived by the peripheral vision.

The resolution of the display devices, generating images thanks to separated discrete pixels, is based on this visual acuity characteristic: depending on the distance of observation, the pixels cannot be perceived if their spatial frequency is higher than the separation capability of the eye.

The Human eye, in the fovea area, can approximately discriminate two points separated by one minute of arc angle. It means for instance that a 42" HD (High Definition) screen 1920×1080 pixels, having a width of 93 cm, can be watched at a distance of 166 cm, to have a pixel density of 60 pixels per degree in its central part, corresponding approximately to the visual acuity.

Here, an example will be discussed in relation to an exemplary HMD device having a resolution of 1280×800 pixels. In this example, the horizontal field of view will be approximately 90° (or 110° depending on the sources), and the theoretical number of pixels per eye will be 640 (but likely closer to 500 practically): 500 pixels distributed over 90° implies a pixel density lower than 5 pixels per degree. That is 10 times lower than what should be required to respect Nyquist-Shannon sampling theorem for a visual acuity of one arc minute. Even if the next generation of this HMD should be based on a display having 1920×1080 pixels, the resolution should remain far below the visual acuity in the fovea area.

Inversely, the pixel density in the peripheral vision area is too high to be perceived by the human eye as visual acuity decreases strongly in the visual periphery.

This disclosure illustratively describes a display device such as HMD device increasing the pixel density in an area of the display, and decreasing this density in the peripheral areas of the area with increased pixel density. Since the eyes can move in the content provided by the display, this increase of density is not limited to the extremely narrow area corresponding to the fovea, but is applied to an area corresponding to the average eye movements, before moving the head. It means that the user can move his gaze around an area with high density information, and enjoy a feeling of immersion thanks to the large field of view providing sparse information.

In a HMD device coupled with an inertial measurement unit (IMU), the user can move his/her head to center of an object or area perceived with low resolution in periphery, to then dramatically increase the resolution on this object or area.

On a currently available HMD device such as the Oculus Rift HMD, the pixels generated by the display device are distributed by the optics with an almost constant density over the whole field of view. Since this optics is simple, it introduces a strong pincushion distortion that must be compensated by signal processing, by applying the inverse deformation to the video content to be displayed. The viewer can perceive a video or graphic immersive content with a large field of view, but with a poor resolution, even in the central area of the HMD.

What is called "foveation" is known in the technical field of image acquisition. Images can be acquired thanks to foveated sensors, where the density of photosites is higher in the central area of the sensor or with a standard sensor associated with a foveated lens.

Foveated imaging is also known in the technical field of signal processing, covering image compression, image transmission, or gaze contingent displays. For this last application, an eye tracker detects where the user is looking, and more information (image portions containing high frequencies) is dynamically displayed in this area than in the periphery (only low frequencies, blur).

It is proposed in this disclosure a system which is configured to (or adapted to) increase the pixel density in an area on the display, and decreasing the pixel density in the peripheral regions of the area on the display. However, it should be noted that, unlike foveated images where details (high frequencies) are displayed in the area of interest, and blurry information (or only low frequencies) are displayed in periphery with a constant pixel density, the proposed system modifies the pixel density itself.

The repartition of the pixels may be modified by the transformation T applied by the optics. In this case, the content to be displayed needs to be modified by the inverse geometric transformation $T^{-1}$. Then, an increase of the pixel density increases the perceived luminance, and vice versa. This modification of luminance needs to be totally or partially compensated by the display or the signal processing applied to the images to be displayed.

Figure 2:
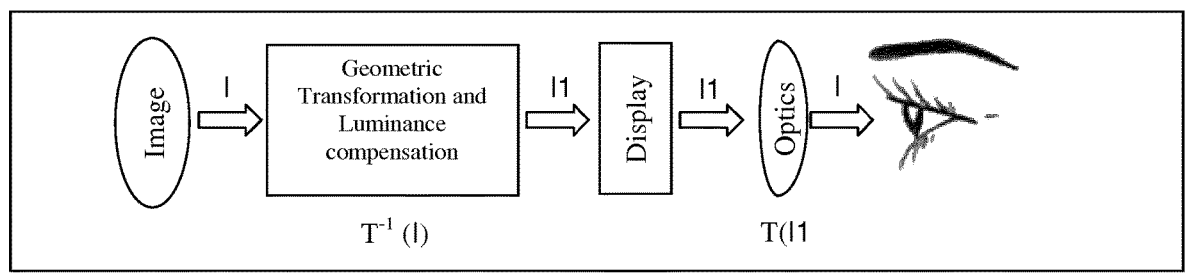
FIG. 2 presents the general overview according an embodiment of the present disclosure.

FIG. 2 presents the general overview according an embodiment of the present disclosure.

A conventional optical element modifies the light as if it was generated at infinity (or at finite but large distance) from the viewer to allow accommodation by the viewer's eyes. It can also increase the field of view of the display to improve the feeling of immersion by the viewer.

Figure 3:
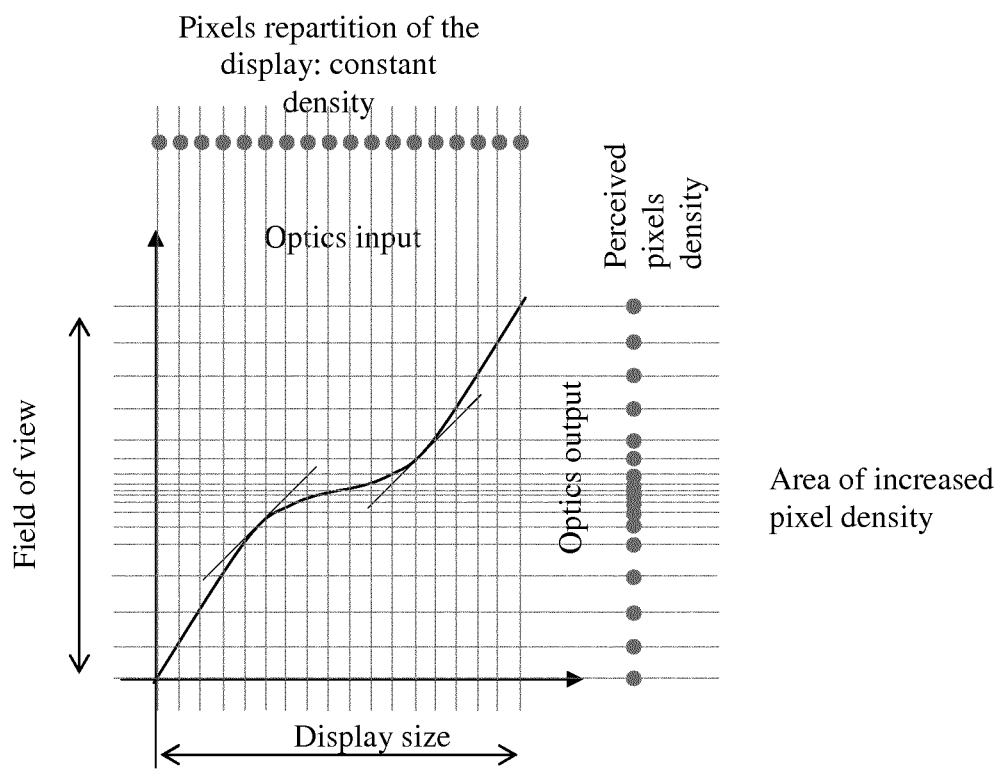
FIG. 3 represents a distortion applied by an optical element.
Figure 4:
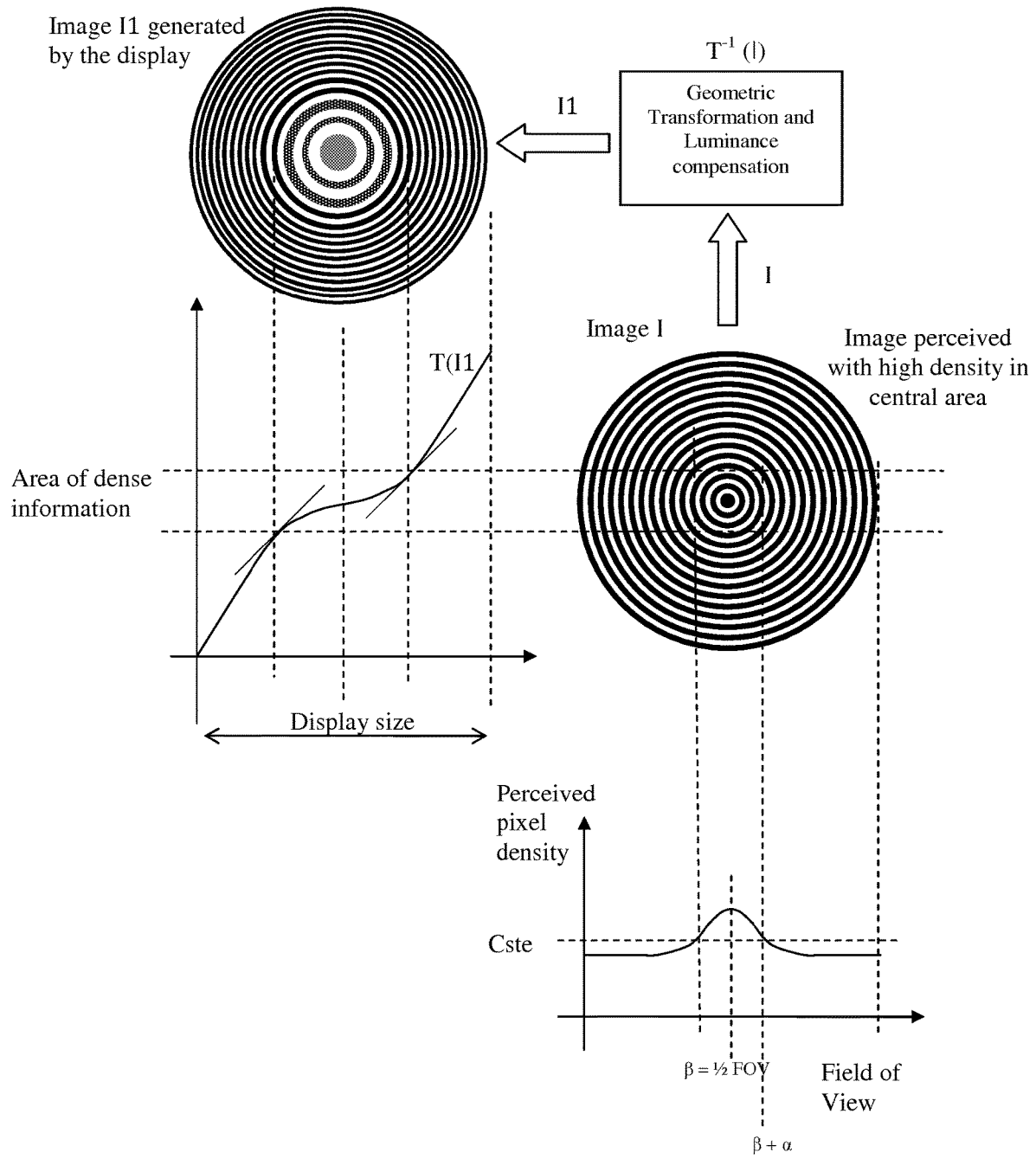
FIG. 4 illustrates a geometric transformation process applied to an image according to the embodiment of the present disclosure.

In addition to the conventional art, the non-limitative embodiment of the present disclosure proposes that the optical element applies a distortion (as shown in FIG. 3) to modify the perceived pixel density, depending on the distance to the center. This distance may be radial or axial, according to the horizontal axes. As can be seen in FIG. 4, the distortion caused by the optical element of the embodiment of the present disclosure provides pixels repartition, that is, constant density of pixels displayed on the display is transformed into a modified pixels density in which increased pixels density is perceived in the central area of field of view.

FIG. 4 illustrates a geometric transformation process applied to an image according to the embodiment of the present disclosure. Before being provided to the display, the input image I is transformed by the function $T^{-1}(I)$, preserving the details in the central area. This transformation must correspond to the inverse transformation function applied by the optical element of the embodiment of the present disclosure. It may be approximated for example by a polynomial function. The optical element applies the distortion T(I1), to provide the image I to the viewer, with a high density of information in the central area (around β) which is the center of the field of view (see FIG. 4).

The pixel density perceived by the viewer is represented by a curve in FIG. 4. The "α" represents the position around β, defining the limit position where the pixel density is increased or decreased, compared to a constant density of pixels. This curve depends on the optical transformation and is given here as an example. The perceived density of pixels could for instance decrease continuously, up to the maximum field of view.

The position β where the perceived density is at a maximum value is here placed at ½ FOV (Field of View). This position can vary if the eye moves and be tracked by an eye tracking system on the HMD device. The optical element can be shifted left to right, up and down depending on the output from the eye tracking system output signal to align the maximum density region with the optical axis of a given eye. The image signal will be modified according to the new $T/T^{-1}$ transforms associated with the modified optical configuration. When the eye is tracked and the optical element shifted accordingly, the value α can be decreased in the optical design, restricted to the fovea extension but excluding the eye motion margins considered in the static configuration.

The proposed solution has to be compared to the standard implementation in order to compare the relative perceived pixel density per angular sector.

Figure 5:
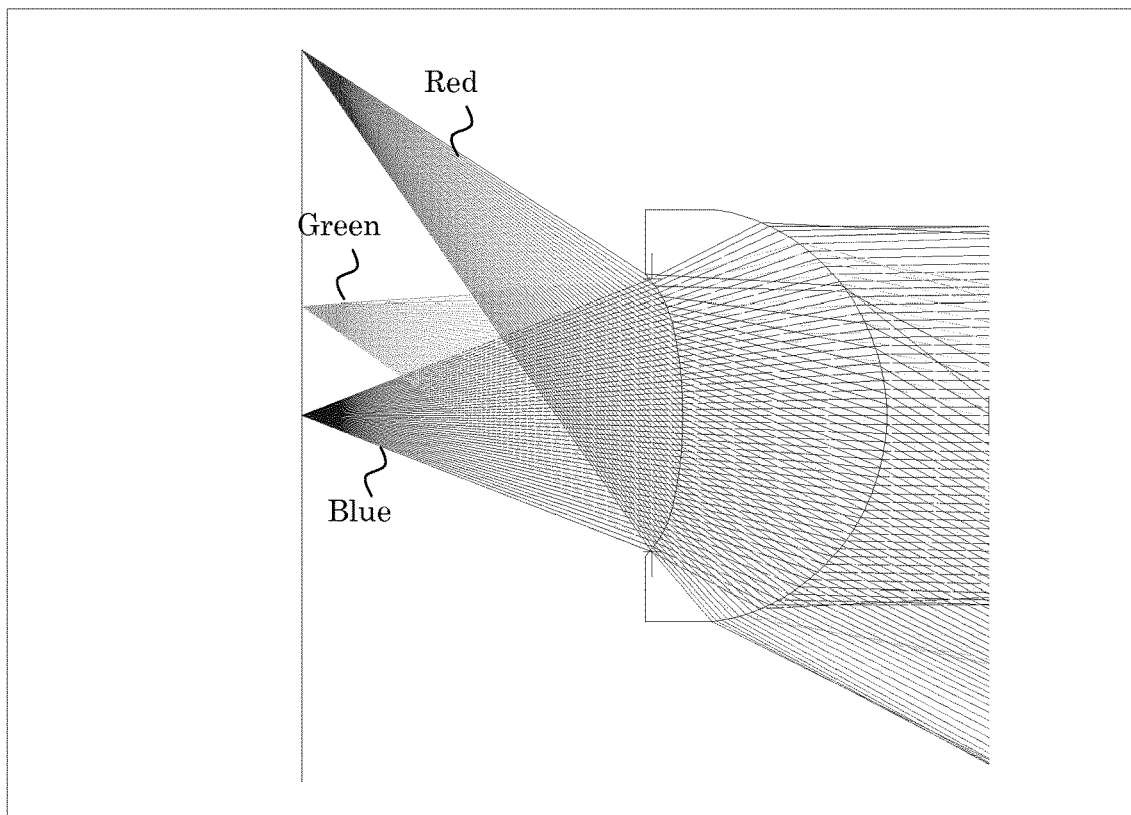
FIG. 5 illustrates a design of a lens with the same functionality than in the original system.

FIG. 5 illustrates a design of a lens with the same functionality than in the original system.

The optical system is dimensioned for having a total field of view of about 95°, the object field width is 2×37.5 mm, which is the width of the screen. FIG. 5 shows the ray tracing for the axial field point, an intermediary one and the marginal field. The system is designed to be afocal in image space and the pupil is of 4 mm at 10 mm distance from the sag of the last optical surface. The MTF (Modulation Transfer Function) at the marginal field point is of course pretty bad as this can be inferred from the non-collimated red sub-beam reaching the pupil. The perceived field of view in image space is of ±29°.

In order to modify the perceived angular pixel densities, a lens needs to be set up in the vicinity of the object plane. That field lens shall map the pixels in the central part of the display around the optical axis with more angular density in the image space than outer pixels. The optical surface with such a property is necessarily an even asphere. It is a rotationally symmetric polynomial aspheric surface described by a polynomial expansion of the deviation from a spherical surface. The even asphere surface model uses only the even powers of the radial coordinate to describe the asphericity. The surface sag is given by:

$$z = \frac{cr^2}{1 + \sqrt{1 - (1+k)c^2r^2}} + \alpha_1 r^2 + \ldots + \alpha_8 r^{16}$$

where c is the curvature, r is the radial coordinate in lens units and k is the conic constant. The field lens needs to have both its front surface aspheric in order to modulate separately the different locations of the field points, and it also needs to have a rear aspheric surface for pointing each chief ray toward the entrance pupil of the optical system of the HMD device of the present embodiment.

Figure 6:
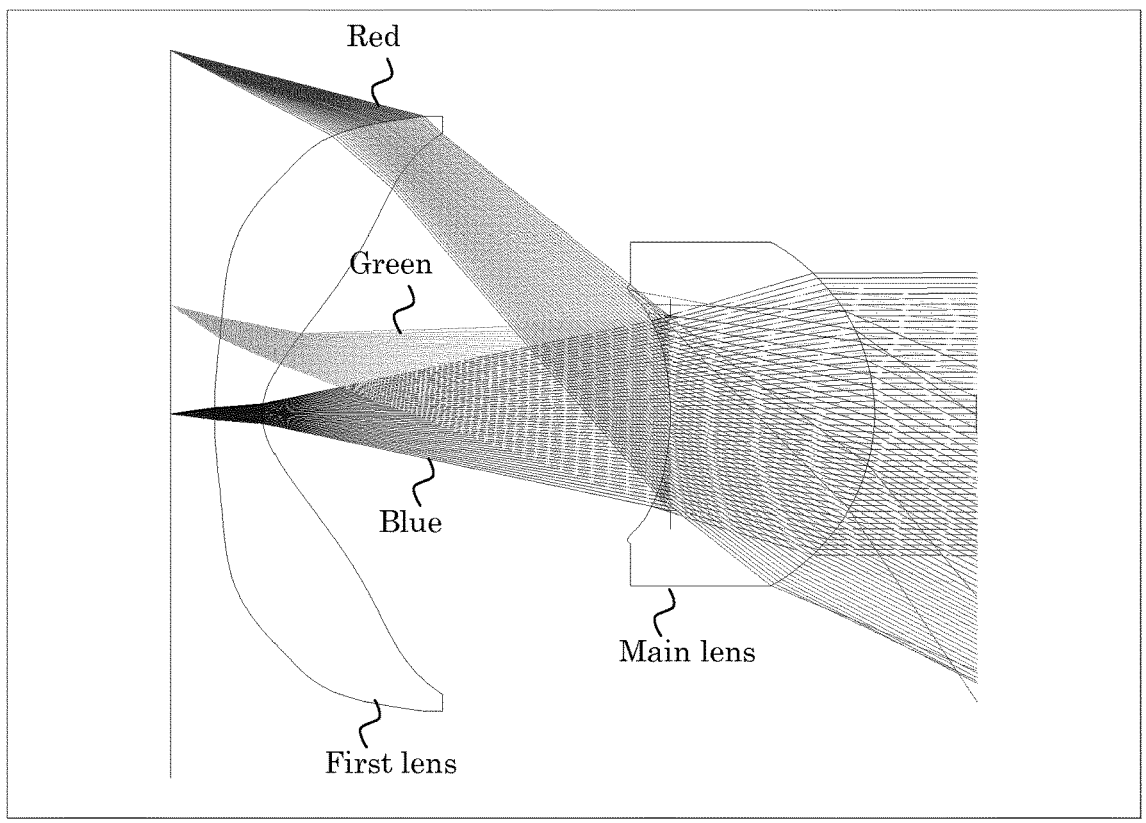
FIG. 6 shows the whole optical system of the HMD device of the present embodiment.

FIG. 6 shows the whole optical system of the HMD device of the present embodiment, which improves the angular resolution density near the axis. The first lens is the one which is warping the field points to different angular densities in the image space. Its shape seems complicated but it is made out of B 270 (trademark) glass by SCHOTT AG and can be molded in high volumes and low costs as well as the main lens which is also made of the same material and which also needs to be molded since it also has two aspheric surfaces.

The lens prescription is as follows:
Surface Data Summary:

| Surf. | Type | Radius | Thickness | Glass | Diameter | Conic | Comment |
|---|---|---|---|---|---|---|---|
| OBJ | STANDARD | Infinity | 4.3333 | | 75 | 0 | |
| 1 | EVENASPH | 41.44078 | 4.669471 | BK7 | 61.37206 | 0 | |
| 2 | EVENASPH | 6.699356 | 40.00001 | | 57.869 | 2.287118 | |
| STO | STANDARD | Infinity | 0 | | 20 | 0 | |
| 4 | EVENASPH | −22.21413 | 20 | BK7 | 26.72005 | 0 | |
| 5 | EVENASPH | −18.07581 | 10 | | 35.41718 | 0 | |
| IMA | STANDARD | Infinity | | | 4 | 0 | |

Surface Data Detail:

Surface OBJ STANDARD

Surface 1 EVENASPH

Coefficient on r^ 2: 0
Coefficient on r^ 4: −6.9859233e−005
Coefficient on r^ 6: 2.4668817e−007
Coefficient on r^ 8: −3.9883699e−010
Coefficient on r^10: 5.5885882e−013
Coefficient on r^12: −6.6854249e−016
Coefficient on r^14: 3.6309444e−019
Coefficient on r^16: −1.5338173e−023

Surface 2 EVENASPH

Coefficient on r^ 2: 0.0028058026
Coefficient on r^ 4: −2.6206468e−005
Coefficient on r^ 6: 1.0404351e−008
Coefficient on r^ 8: 1.903396e−011
Coefficient on r^10: −6.34717e−015
Coefficient on r^12: 0
Coefficient on r^14: 0
Coefficient on r^16: 0

Surface STO STANDARD

Surface 4 EVENASPH

Coefficient on r^ 2: 0
Coefficient on r^ 4: 0.00049344985
Coefficient on r^ 6: 1.8727954e−005
Coefficient on r^ 8: 3.8728936e−007
Coefficient on r^10: −4.8665752e−009
Coefficient on r^12: 3.6241717e−011
Coefficient on r^14: −1.4659605e−013
Coefficient on r^16: 2.4658053e−016

Surface 5 EVENASPH

Coefficient on r^ 2: 0
Coefficient on r^ 4: 0.00019263165
Coefficient on r^ 6: −4.3484529e−006
Coefficient on r^ 8: 5.3643851e−008
Coefficient on r^10: −3.6869579e−010
Coefficient on r^12: 1.4315606e−012
Coefficient on r^14: −2.9346767e−015
Coefficient on r^16: 2.4867346e−018

As a by-side benefit provided by the configuration of the optical system, the MTF has been improved also.

Figure 7:
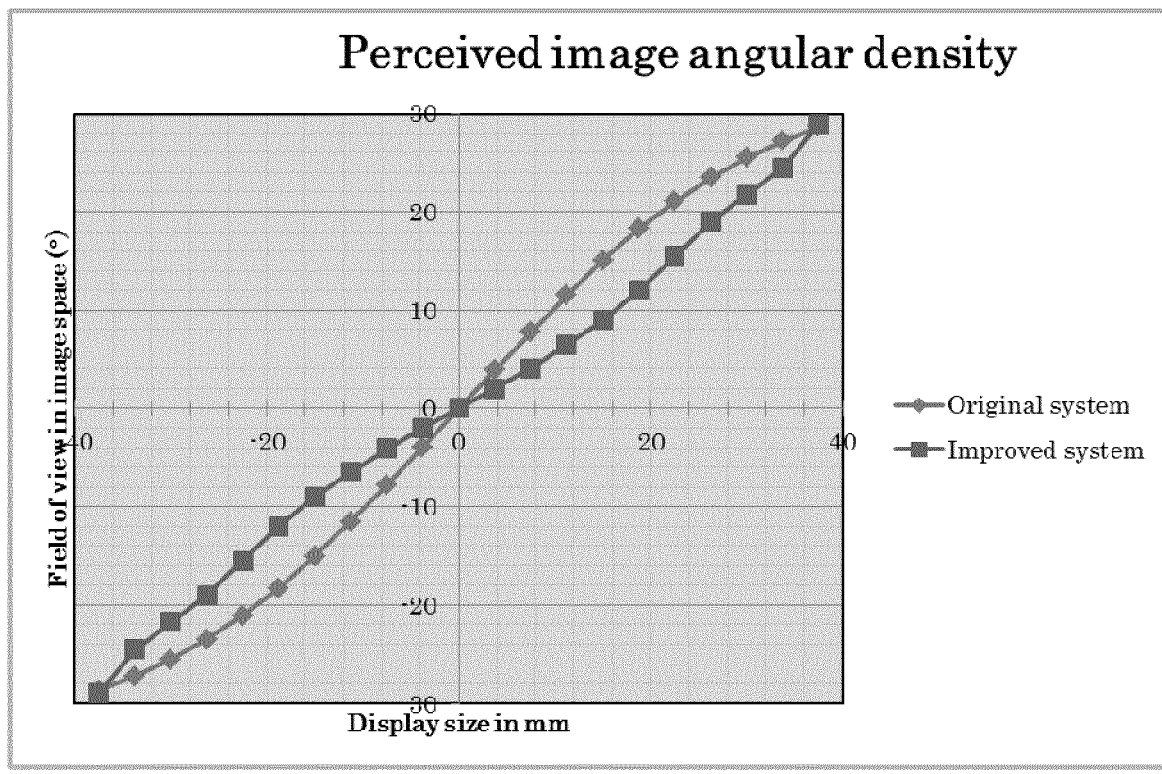
FIG. 7 shows a perceived field of view plotted as a function of the field position on the display.

Finally, in order to demonstrate that the optical system shown in FIG. 6 has the functionality described in this disclosure, the perceived field of view can be plotted as a function of the field position on the display as shown in FIG. 7. As it can be seen from FIG. 7, the improved system has effectively a curve shaped like the theoretical one shown in FIG. 4 resulting in a higher perceived pixel density in the vicinity of the optical axis direction.

Figure 8:
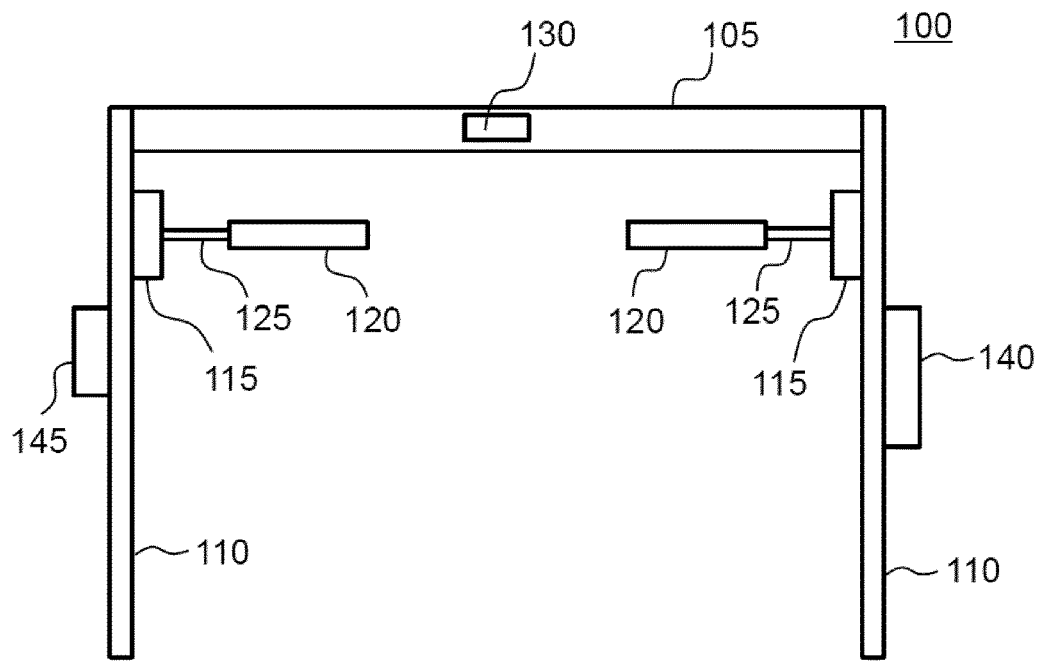
FIG. 8 schematically illustrates a display device according to an embodiment of the present disclosure, in which FIG. 8(*a*) is a plan view of the device and FIG. 8(*b*) is a front view of the device.
Figure 8:
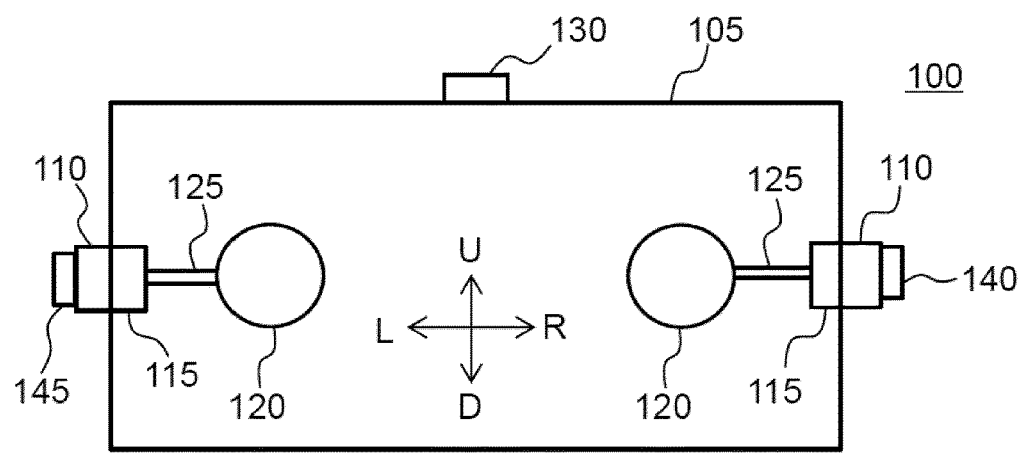

FIG. 8 schematically illustrates a display device according to an embodiment of the present disclosure, in which FIG. 8(a) is a plan view of the device and FIG. 8(b) is a front view of the device.

As shown in FIG. 8, a display device 100 may include a display module 105 which can be an LCD (Liquid Crystal Display) with a light source or an OLED (Organic Light Emitting Display), for example. Fixing elements 110 such as temple arms, that will extend respectively over the ears of a viewer to help hold the device 100 in place, are mounted on both sides of the display device 100. Alternatively, the fixing element 110 may be an expansion band to hold the device 100 on viewer's head.

The display device 100 also includes an optical component 120 and an actuator 115 to move the optical component 120. The optical component 120 may comprise the two optical elements designed as described above in connection with FIG. 6. The optical component 120 is connected to the actuator 115 through a connecting member 125. The actuator 115 is mounted on the fixing elements 110 and the optical component 120 is supported by the connecting member 125 in front of the display module 105. These actuator 115, optical component 120 and connecting member 125 are mounted on both sides of the fixing elements 110, respectively. Thanks to the actuators 115, the optical components 120 can be moved up and down and left to right, as indicated by the arrows shown in FIG. 8(*b*), respectively. It should be noted that each optical element of the optical component 120 can alternatively have a form of Fresnel lens so that the optical elements can have thinner shape and lighter weight.

The display device 100 is provided with an eye tracking sensor 130 to detect eye gaze point of the eyes of viewer. The eye tracking sensor 130 may be mounted on the upper or lower portion of the display module 105, for example so as to prevent any shading of display screen which may be caused by the sensor 130. Further, display device 100 is provided with a position sensor 145 such as inertial measurement unit (IMU) to measure the position of a viewer's head on which the display device 100 is mounted.

The display device 100 further includes a control module 140 to control the display module 105, actuators 115, the eye tracking sensor 130 and the position sensor 145. The control module 140 is connected to these elements via wired or wireless connection. The control module 140 is also connected to an external device (not shown) via wired or wireless connection. The external device stores images or videos to be provided to the display device 100. The images or videos are provided from the external device to the control module 140, then the control module 140 presents the received image or video on the display module 105.

The display device 100 may have a hood (not shown) surrounding the periphery of the display module 105 to provide a dark space in the field of view of the viewer, which may provide the viewer with better feeling of immersion.

Figure 9:
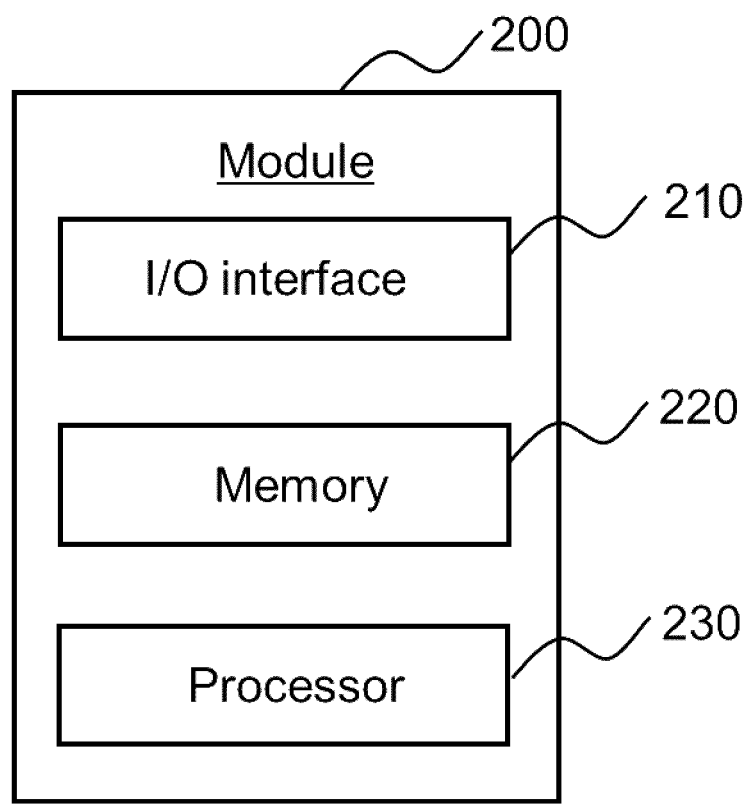
FIG. 9 is a block diagram illustrating components of the control module shown in FIG. 8.

FIG. 9 is a block diagram illustrating components of the control module shown in FIG. 8.

As shown in FIG. 9, the control module 200 comprises an I/O interface 210 and a memory device 220. The interface 210 and memory device 220 are configured to receive and store images or videos to be presented on the display module 105 (FIG. 8).

The module 200 further comprises a processor 230. The processor 230 performs to detect eye gaze point of the viewer based on the inputs from the eye tracking sensor 130, to activate the actuators 115 in response to the detected eye gaze point, to present images or videos received from the external device on the display module 105 and to scroll the images or videos displayed on the display module 105 in response to a viewer's head position detected and input by the position sensor 145.

The processor 230 further performs to modify the images or videos by applying a geometric transformation $T^{-1}(I)$ as described in reference to FIG. 4 so that information density of the images or videos in an area around the detected eye gaze point on the display 105 (FIG. 8) can be increased. The processor 230 may further apply luminance compensation to compensate a variation of luminance in the images or videos which could be caused by the geometric transformation $T^{-1}(I)$. The memory device 220 is also configured to store at least one program to be executed by the processor 230 for performing the above mentioned processes.

Figure 10:
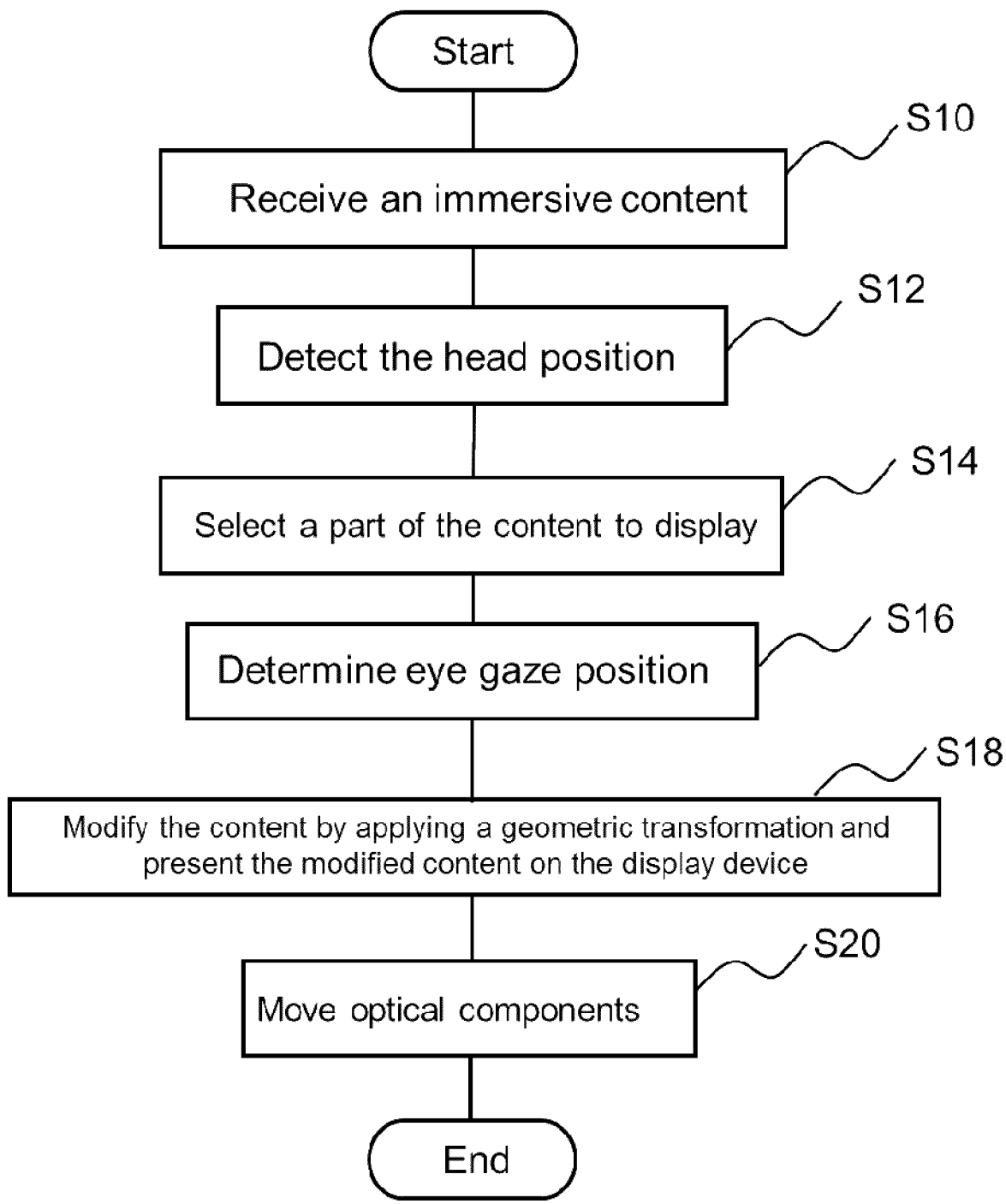
FIG. 10 is a flow chart illustrating an example of a process performed by the display device according to an embodiment of the present disclosure.

FIG. 10 is a flow chart illustrating an example of a process performed by the display device according to an embodiment of the present disclosure.

At step S10, the control module 140; 200 of the display device 100 receives an immersive, image or video content from an external device (not shown) via its I/O interface 210. The received content is stored on the memory module 230. The immersive content may be a whole content available for the HMD device to display a 360° content (or less than 360°, but more than what can be displayed by the HMD's display screen), in other words, the immersive content may have wider area than the area of HMD's display screen. Thanks to such an immersive content, a viewer can be immersed in a virtual world displayed on the HMD device and can move his/her head to select a part of the whole 360° content he/she wants to see.

At step S12, the viewer's head position is detected by the position sensor 145, then at step S14, a part of the 360° content to be displayed on the HMD device is selected by the processor 220. The part of the 360° content that the viewer wants to see corresponds to the detected head position.

At step S16, eye gaze position of the eyes of viewer on which the display device 100 is mounted is determined by the eye tracking sensor 130. The detected information is output from the sensor 130 to the processor 220 of the control module 200. Based on the detected information, the processor 220 performs an analysis for specifying an eye gaze position of the eyes of viewer on the display module 105, in other words, for specifying which area on the display module 105 the viewer is watching. It should be noted that the step S16 can be performed during steps S10-S14.

Alternatively, at step S16, information of Region of Interest (ROI) in the content can be employed to determine eye gaze position of the eyes of viewer instead of the detection of eye gaze position by the eye tracking sensor 130. In this case, areas of ROI in the content (each image or each frame of video) can be determined in advance by test users or by any known dedicated ROI analysis software and associated with the content via metadata incorporated in the content. The areas of ROI in the content can be presumed eye gaze positions since the viewer most likely pay attention to the area of ROI in the content and thus eye gaze will be even more attracted by these ROIs.

At step S18, the processor 220 reads out the image or video stored in the memory module 230 and modifies the image or video so that an area having higher density information of the image or video can be formed at the specified eye gaze position on the display 105. The modification of the image or video may be performed by applying a geometric transformation which corresponds to the inverse transformation function applied by the optical components 120 (FIG. 4). Then, the processor 220 presents the modified image or video content on the display device 105.

At step S20, the processor 220 controls the actuators 115 to move the respective optical components 120 in response to the specified eye gaze position on the display 105 so that the viewer can see the display 105 through the optical components 120. For example, an association between eye gazes positions on the display 105 and their respective corresponding positions of the optical components 120 may be established in advance and stored on the memory module 230. In this case, the processor 220 causes the actuators 115 to move the optical components 120 to a position which corresponds to the detected eye gaze position according to the association.

Since the optical components 120 apply the distortion T(I1) which will compensate the transformation made on the image or video presented on the display 105, the image or video content perceived by the viewer through the optical components 120 has a higher density of information in the eye gaze position than that in the periphery of the eye gaze position.

The steps S12 through S20 may be repeated during the image or video content is presented on the display 105, which allows to change the dense information area on the image or video (the area of the image or video content having higher density of information than that in the rest of the content) and the positions of the optical components 120 in response to the detected eye gaze position in real time.

According the embodiment, the density of information available in the eye gaze area on the display 105 can be dramatically increased, thus more details can be provided in this area. On the other hand, since the visual acuity is much lower in peripheral vision, the feeling of immersion brought by a large field of view can be preserved.

Alternatively, the dense information area on the image or video and the positions of the optical components 120 may be fixed, for example, the dense information area on the image or video may be fixed in the central area of the image or video on the display 105 and positions of optical components 120 may be the corresponding positions. In this case, the above described steps S12 and S16 may be omitted.

Yet alternatively, at step S14, the processor 220 may modify the image or video directly received from the external device and present the modified image or video on the display device 105. In this case, the received image or video content may not be stored on the memory module 230.

All examples and conditional language recited herein are intended for pedagogical purposes to aid the reader in understanding the disclosure and the concepts contributed by the inventor to furthering the art, and are to be construed as being without limitation to such specifically recited examples and conditions, nor does the organization of such examples in the specification relate to a showing of the superiority and inferiority of the disclosure.

The invention claimed is:

1. A method for presenting an image on a display device including:
   modifying the image by applying a geometric transformation to at least one area of the image; and
   presenting the image to which the geometric transformation has been applied on the display device, wherein the at least one area of the image presented on the display device is viewed by a viewer through an optical component applying an inverse transformation corresponding to the geometric transformation that has been applied to the image so that the at least one area of the image to which the geometric transformation was applied is perceived by the viewer as having a higher density of pixels than other areas of the image outside of the at least one area of the image, wherein the optical component comprises an optical element that includes two aspheric surfaces, and wherein the optical element includes a first optical lens having a convex surface facing a first side and a concave surface facing a second side and a second optical lens having a concave surface facing the first side and a convex surface facing the second side.

2. The method according to claim 1, further including:
   determining eye gaze position of the viewer; and
   changing the area of the image on the display device having the higher density of pixels and the position of the optical component in response to the determined eye gaze position.

3. The method according to claim 1, wherein the position of the area of the image on the display device having the higher density of pixels is fixed at a predetermined position on the display device.

4. The method according to claim 1, wherein the display device is a head mounted display (HMD) device.

5. The method according to claim 4, wherein the content has wider area than what can be displayed on the display device, and wherein the method further includes:
   detecting a head position of the viewer; and
   selecting a part of the image to be displayed on the display device in response to the detected head position.

6. A display device for presenting an image comprising at least a processor configured to:
   modify the image by applying a geometric transformation to at least one area of the image; and
   present the image to which the geometric transformation has been applied on the display device,
   wherein the display device further comprises an optical component through which the image on the display device is presented to a viewer, wherein the optical component is configured to apply an inverse transformation corresponding to the geometric transformation that has been applied to the at least one area of the image so that the image is perceived by the viewer as having a higher density of pixels than other areas of the image outside of the at least one area of the image, wherein the optical component comprises an optical element that includes two aspheric surfaces, and wherein the optical element includes a first optical lens having a convex surface facing a first side and a concave surface facing a second side and a second optical lens having a concave surface facing the first side and a convex surface facing the second side.

7. The display device according to claim 6, further comprising an eye tracking sensor, and wherein the processor is further configured to:
   determine eye gaze position of the viewer in cooperation with the eye tracking sensor; and
   change the area of the image on the display device having the higher density of pixels and the position of the optical component in response to the determined eye gaze position.

8. The display device according to claim 6, wherein the processor is further configured to:
   determine eye gaze position of the viewer based on information of Region of Interests incorporated in the content; and
   change the area of the image on the display device having the higher density of pixels and the position of the optical component in response to the determined eye gaze position.

9. The display device according to claim 7, further comprising an actuator to move the optical component, wherein the position of the optical component is changed by operating the actuator in response to the determined eye gaze position.

10. The display device according to claim 6, wherein the position of the area of the image on the display device having the higher density of pixels is fixed at a predetermined position on the display device.

11. The display device according to claim 6, wherein the display device is a head mounted display (HMD) device.

12. The display device according to claim 11, further comprising a position sensor to detect a head position of the viewer, wherein the image has wider area than what can be displayed on the display device, and wherein the processor is further configured to:
  detect a head position of the viewer in cooperation with the position sensor; and
  select a part of the image to be displayed on the display device in response to the detected head position.

13. A method, comprising:
  displaying a first area of an image on a display device to a viewer; and
  displaying a second area of the image adjacent to the first area;
  wherein the first area is configured to be perceived by the viewer as having a higher density of pixels than the second area;
  wherein the first area changes with a direction of the viewer's gaze;
  wherein the first area is viewed by the viewer through an optical component applying an inverse transformation corresponding to a geometric transformation that has been applied to the image;
  wherein the optical component comprises an optical element that includes two aspheric surfaces; and
  wherein the optical element includes a first optical lens having a convex surface facing a first side and a concave surface facing a second side and a second optical lens having a concave surface facing the first side and a convex surface facing the second side.

14. The method of claim 13, further comprising changing the first area in response to the viewer's head position.

15. The method of claim 13, wherein the display device is a head mounted display (HMD) device.

16. The method of claim 15, further comprising providing a position sensor on the display device to detect a head position of the viewer.

17. The method of claim 16, further comprising selecting a part of the image to be displayed on the display device in response to the detected head position.

18. The method of claim 17, further comprising providing an eye tracking sensor on the display device to detect eye gaze position of the viewer, and changing the area of the image on the display device having the higher density of pixels and the position of the optical component in response to the determined eye gaze position.

19. The method of claim 15, further comprising providing an eye tracking sensor on the display device to detect eye gaze position of the viewer.

20. The method of claim 13, wherein the first area is a center of the display and the second area is a periphery of the display device.

* * * * *